United States Patent [19]

Godtland

[11] 4,110,975
[45] Sep. 5, 1978

[54] JET ENGINE HAVING COMBUSTION CHAMBER WITHIN COMPRESSOR

[76] Inventor: Magne Godtland, 2500 Tynset, Norway

[21] Appl. No.: 762,797

[22] Filed: Jan. 25, 1977

[30] Foreign Application Priority Data

Jan. 27, 1976 [NO] Norway .............................. 760256

[51] Int. Cl.² ............................................. F02K 3/02
[52] U.S. Cl. ...................................... 60/262; 60/269; 60/39.35; 415/80
[58] Field of Search ...................... 60/262, 269, 39.34, 60/39.35; 415/80-82

[56] References Cited

U.S. PATENT DOCUMENTS

| 2,448,972 | 9/1948 | Gizara | 60/39.35 |
| 3,005,311 | 10/1961 | Ross | 60/39.35 |
| 3,121,414 | 2/1964 | Peterson | 60/262 |
| 3,287,904 | 11/1966 | Warren et al. | 60/39.34 |

*Primary Examiner*—Robert E. Garrett
*Attorney, Agent, or Firm*—Cushman, Darby & Cushman

[57] ABSTRACT

A jet engine, comprising a long, tube-shaped casing open at both ends, a shaft supported centrally in the casing, a compressor and gas turbine rigidly connected to the shaft, and a combustion chamber with fuel supply located between the compressor and turbine. The engine is equipped with two coaxial compressors with radial blades. The compressors are separated by a backwardly-diverging, conical partition, by a radial turbine disposed immediately back of the compressor in connection with the back end of the conical partition. A rear wall is disposed in back of the turbine. The combustion chamber is bound by said wall, said conical partition and the turbine blades.

5 Claims, 4 Drawing Figures

JET ENGINE HAVING COMBUSTION CHAMBER WITHIN COMPRESSOR

The present invention relates to a jet engine comprising a long, tube-shaped casing, open at both ends, a shaft supported centrally in the casing, a compressor and a turbine rigidly connected to the shaft, and a combustion chamber with fuel supply disposed between the compressor and turbine.

In the known engines of this type, either axial or radial compressors and axial or radial turbines are used. The turbines work like a gas turbine, which is driven by the discharging exhaust gases from the combustion chamber and is coupled to the same shaft as the compressor and thus also drives the compressor. Up to one-half of the energy in the discharged exhaust gases is utilized by the gas turbine to drive the compressor, which compresses the air supplied to the combustion chamber.

A problem with jet engines is the high temperatures under which they operate. These temperatures are tolerated rather well by modern materials, but one does experience large heat losses, which of course result in decreased efficiency. A conventional jet engine has an extended combustion zone, and, therefore, large surfaces which are heated up, with resultant large heat losses. This is clearly shown in FIG. 1, which shows a conventional engine, where *a* designates that part of the engine which is exposed to high temperatures and large heat losses.

The present invention seeks to eliminate this drawback, as well as to provide a jet engine which is simple and light-weight, and which provides for good utilization of fuel and also gives a clean exhaust gas.

This is achieved according to the invention by a jet engine of the type described above, but characterized by two coaxial compressors with radial blades, these compressors being separated from one another by a backwardly-diverging, conical partition, by a radial turbine disposed immediately back of the compressors in connection with the back end of the conical partition, and by a rear wall disposed in back of the turbine, the combustion chamber then being bound by said back wall, said conical partition and the blades of said turbine.

In a preferred embodiment of the invention, the back wall is crowned or slightly conical, the tip extending into the space inside the turbine blades. A further feature of the invention is that the diameter of the tube-shaped casing increases from the front edge of the turbine to its back edge.

In a further improvement, the conical partition has a forwardly-directed, tube-shaped extension, which separates the incoming air into two streams, one flowing over the inner compressor to the combustion chamber and the other over the outer compressor to the space outside the turbine blades. Both of the compressors preferably have straight, radial blades.

The invention will be further explained in the following with reference to the drawings, where:

Figure 1:
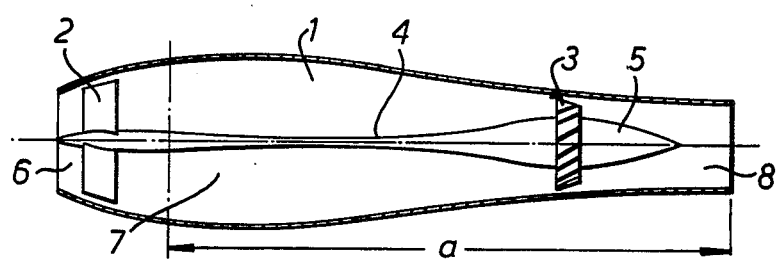
FIG. 1 is a schematic cross section through a conventional jet engine.

In FIG. 1, which shows the previously known construction, the tube-shaped casing is designated 1, the compressor 2, the turbine 3, the shaft 4, and a streamlined member 5. Intake air enters through the forward opening 6 and is pumped by the compressor 2 into the combustion chamber 7, where fuel is injected by a means not shown and combusted. The exhaust gases are driven by expansion toward the back with great force, and drive the gas turbine 3, which in turn drives the compressor 2 via the shaft 4. The gas discharging at high velocity through the rear opening supplies the engine's thrust.

The jet engine according to the invention also has a tube-shaped casing 1, but the compressor is divided in two, into and outer compressor 2' and an inner compressor 2". The inner 2" and outer 2' compressors are separated by a conical partition 9, which has a forwardly directed, cylindrical, tube-shaped extension 10. The compressors are fixed to the shaft 4, which is supported by a forward bearing 11 and a rear bearing 12.

At the rear edge of the conical partition 9, a radial turbine 13 is fixed, this turbine 13 being closed at the back by a conical partition 14 which is located approximately in the middle of the shaft 4. The combustion chamber 15 is bound by the conical partition 9, the conical back wall 14 and the blades of the turbine 13.

The intake air which enters through the intake 6 is divided into two stream portions 16 and 17. The air stream 16 travels along the outside of the extension 10 and is compressed in the outer compressor portion 2'. The inner air stream 17 enters the extension 10 and is compressed by the compressor 2" inside the combustion chamber 15. Due to the shape of the blades, the air is made to travel outwardly and is also made to rotate in the same direction as the turbine's direction of rotation. This has a desirable effect, because losses due to deflection are reduced. The second compressor 2', in other words, pumps air into the space 16 outside the radial turbine blades, where an afterburning will take place, so that one achieves complete combustion of the fuel, and therefore, clean exhaust gases.

Figure 2:
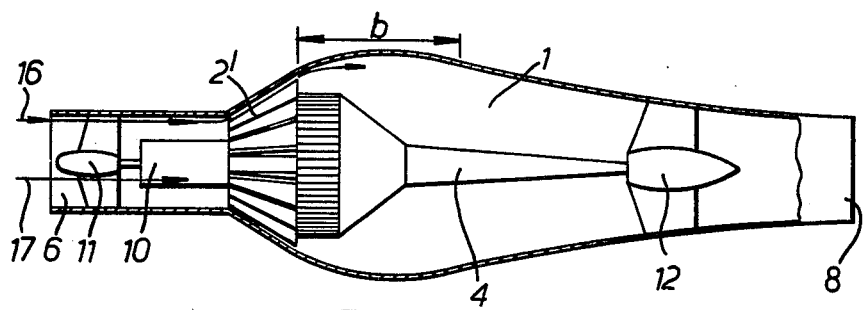
FIG. 2 is a schematic cross section through the jet engine according to the invention.
Figure 3:
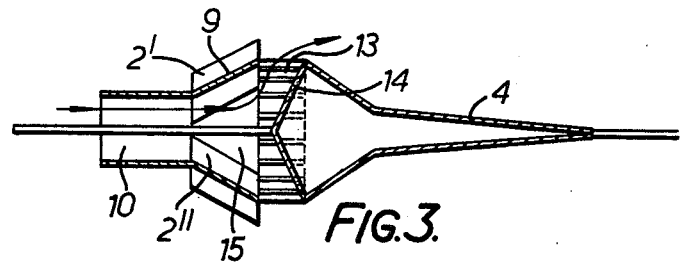
FIG. 3 is a cross section through the compressor, showing the partition and the turbine rotor.
Figure 4:
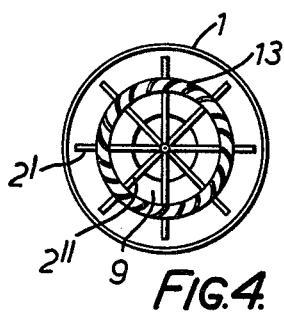
FIG. 4 is a sketch of the turbine rotor and compressor, seen from the rear and with the back wall removed.

As one can see from FIG. 2, only a short section *b* of the tube-formed casing will have a high temperature, owing to the afterburning in the space 16, so that one thus experiences relatively small heat losses as compared to the heat losses on a conventionally-designed jet engine, where all of the surface is heated up to high temperatures.

The compressor functions like a centrifugal fan, and the whole combustion chamber rotates like a centrifuge. If one places a particle in a centrifuge which rotates at high velocity, then the particle (in this case, gas particles) will be pressed against the outer wall of the centrifuge with great force. The outer wall in this case is the conical front wall of the combustion chamber which is divided into sections by the fan blades and turbine blades. When a particle of gas or air is caught up in a section between two fan blades, it cannot return to the combustion chamber owing to the pressure from the combustion and centrifugal force, but will be forced against the conical front wall of the combustion chamber until it comes into contact with the turbine blades and is pressed out between them. This will cause the combustion chamber to rotate and to suck in new air into the chamber through the intake at its center.

Having described my invention, I claim:

1. Jet engine, comprising a long, tube-shaped casing, open at both ends, a shaft supported centrally in the casing, a compressor and gas turbine rigidly connected to said shaft, and a combustion chamber with fuel supply located between the compressor and turbine, characterized by two coaxial compressors with radial blades, the compressors being separated by a backwardly-diverging, conical partition, by a radial turbine disposed immediately back of the compressor in connection with the back end of the conical partition, and by a rear wall disposed in back of the turbine, the combustion chamber then being bound by said wall, said conical partition and the turbine blades.

2. Jet engine according to claim 1, characterized in that the rear wall is crowned or slightly conical, the tip extending into the space inside the turbine blades.

3. Jet engine according to claim 1, characterized in that the diameter of the tube-shaped casing increases from the front edge of the turbine to its back edge.

4. Jet engine according to claim 1, characterized in that the conical partition has a forwardly-directed tube-shaped extension which divides the incoming air into two streams, one flowing over the inner compressor and the other flowing over the outer compressor to the space outside the blades of the turbine.

5. Jet engine according to claim 1, characterized in that both compressors have straight, radially-extending blades.

* * * * *